US012736824B2

(12) United States Patent
Shen et al.

(10) Patent No.: US 12,736,824 B2
(45) Date of Patent: Sep. 15, 2026

(54) ANGLED ILLUMINATION SYSTEM FOR MICROFLUIDIC DEVICES

(71) Applicant: Standard BioTools Inc., San Francisco, CA (US)

(72) Inventors: Zhongwei Shen, San Francisco, CA (US); Kyle Wisdom Hukari, San Francisco, CA (US); Kum Hon Cheang, San Francisco, CA (US)

(73) Assignee: STANDARD BIOTOOLS INC., South San Franciso, CA (US)

( * ) Notice: Subject to any disclaimer, the term of this patent is extended or adjusted under 35 U.S.C. 154(b) by 277 days.

(21) Appl. No.: 18/575,150

(22) PCT Filed: Jul. 1, 2022

(86) PCT No.: PCT/US2022/035963
§ 371 (c)(1),
(2) Date: Dec. 28, 2023

(87) PCT Pub. No.: WO2023/278847
PCT Pub. Date: Jan. 5, 2023

(65) Prior Publication Data
US 2024/0310644 A1 Sep. 19, 2024

Related U.S. Application Data

(60) Provisional application No. 63/217,955, filed on Jul. 2, 2021.

(51) Int. Cl.
*G02B 27/09* (2006.01)
*G02B 21/08* (2006.01)

(52) U.S. Cl.
CPC ....... *G02B 27/0961* (2013.01); *G02B 21/082* (2013.01); *G02B 27/0972* (2013.01)

(58) Field of Classification Search
CPC ........... G02B 21/00–368; G02B 25/00; G02B 25/001; G02B 27/0955; G02B 27/0961;
(Continued)

(56) References Cited

U.S. PATENT DOCUMENTS 4,227,782 A * 10/1980 Norris .................. G03B 21/115
352/40
6,127,681 A 10/2000 Sato et al.
(Continued)

FOREIGN PATENT DOCUMENTS

CN 203250043 U 10/2013
JP 3711785 B2 * 11/2005
(Continued)

OTHER PUBLICATIONS

European Application No. EP22834313.3, Extended European Search Report, Mailed On Apr. 25, 2025, 10 pages.
(Continued)

*Primary Examiner* — Jessica M Merlin
(74) *Attorney, Agent, or Firm* — Kilpatrick Townsend & Stockton LLP

(57) ABSTRACT

Systems and associated methods and techniques for illuminating and imaging a device, such as a microfluidic or microarray device, are described herein. An optical source that illuminates the planar surface at an oblique angle can be used with optical components, such as an offset optical shaping rod and a wedge prism, used to provide uniform illumination across the planar surface and allow the illumination to appropriately reach the target illumination area despite the geometric limitations imposed by the presence and position of imaging, microfluidic control, and/or thermal cycling components.

22 Claims, 11 Drawing Sheets

(58) Field of Classification Search
CPC ............ G02B 27/0972; G02B 27/0994; G02B 13/0095
USPC ................ 359/368–398, 643–647, 656–661; 362/551
See application file for complete search history.

(56) References Cited

U.S. PATENT DOCUMENTS

| | | | | |
|---|---|---|---|---|
| 6,419,365 | B1 | 7/2002 | Potekev et al. | |
| 2004/0246573 | A1* | 12/2004 | Tsuchiya | G02B 21/10 359/368 |
| 2005/0046807 | A1* | 3/2005 | Hanano | G03B 21/208 353/98 |
| 2006/0006067 | A1* | 1/2006 | Unger | G01N 21/8483 204/603 |
| 2006/0078266 | A1 | 4/2006 | Wu et al. | |
| 2006/0250817 | A1 | 11/2006 | Yamashita et al. | |
| 2009/0195866 | A1 | 8/2009 | Kawaski et al. | |
| 2010/0067103 | A1 | 3/2010 | Sangu | |
| 2010/0277581 | A1 | 11/2010 | Matsumoto et al. | |
| 2011/0287426 | A1 | 11/2011 | Ulmer | |
| 2012/0188786 | A1* | 7/2012 | Burges | G02B 19/0028 362/244 |
| 2012/0212711 | A1 | 8/2012 | Goto | |
| 2014/0179566 | A1 | 6/2014 | Linton et al. | |
| 2019/0153511 | A1 | 5/2019 | Unger et al. | |
| 2019/0163132 | A1 | 5/2019 | Sung | |
| 2021/0048289 | A1 | 2/2021 | Sirat | |

FOREIGN PATENT DOCUMENTS

| | | | | |
|---|---|---|---|---|
| JP | 2006065118 | A | 3/2006 | |
| JP | 2010197986 | A | 9/2010 | |
| KR | 20060033581 | A * | 4/2006 | G02B 27/30 |
| WO | 2020097606 | A1 | 5/2020 | |
| WO | WO-2021247930 | A1 * | 12/2021 | B33Y 10/00 |

OTHER PUBLICATIONS

Application No. PCT/US2022/035963 , International Preliminary Report on Patentability, Mailed On Jan. 11, 2024, 13 pages.

Application No. PCT/US2022/035963 , International Search Report and Written Opinion, Mailed On Oct. 12, 2022, 16 pages.

Japanese Application No. JP2023-580954, “Office Action”, Mar. 24, 2026, 10 pages.

* cited by examiner

ANGLED ILLUMINATION SYSTEM FOR MICROFLUIDIC DEVICES

CROSS-REFERENCES TO RELATED APPLICATIONS

This application is the U.S. National Stage of PCT International Application, PCT/US2022/035963, filed on Jul. 1, 2022, which claims the benefit of priority to U.S. Provisional Application No. 63/217,955, filed Jul. 2, 2021, the entire contents of which are incorporated herein by reference for all purposes.

FIELD

This invention is in the field of microscopy. This invention relates generally to an optical system for illuminating the surface of a device at an angle.

BACKGROUND

Microfluidic and microarray devices are employed in genetic sequencing, gene expression, molecular screening, and other applications; device arrays, such as in microfluidic array devices, can be used for parallelization. In some applications, imaging techniques are used for probing reactants or products. Due to the small sizes of microfluidic device arrays and associated flow channels and the presence of thermal control equipment and imaging equipment, however, geometric restrictions can be imposed, limiting the size and arrangement of the optical systems.

SUMMARY

Described herein are systems and methods for projecting light onto planar surfaces at oblique (e.g., non-parallel and non-orthogonal) angles. The planar surfaces can comprise microfluidic device arrays or microarrays, including an array of reaction sites, which can be coupled to thermal cycling components and imaging components (e.g., a microscope). Fluorescence imaging of the microfluidic device array can be used to probe concentrations of compositions in the various reaction sites to investigate different reactions occurring in parallel, for example.

The fluorescence imaging can make use of light from a light source to drive absorption by fluorophores at the various reaction sites, which can then emit fluorescent light. The fluorescent light can be imaged by a microscope, allowing quantification (e.g., fluorophore concentration determination). In some examples, the fluorophores can include or react with nucleic acid molecules. Nucleic acid molecules can be amplified using a polymerase chain reaction (PCR) technique in which the temperature of the reaction sites is thermally cycled, such as using a thermal block coupled to the microfluidic device array or microarray device. The presence of the thermal block and microscope can limit the available space and geometry for illuminating the microfluidic device array with light from the light source. In some examples, the thermal block can be coupled to the bottom of the microfluidic device array and the microscope can be positioned over the top of the microfluidic device array, and so illumination by the light source may occur at an oblique angle.

Angular illumination may, however, result in an configuration where light on different portions of the microfluidic device array has different intensities. The methods and systems described herein allow for more uniform intensities of light across the microfluidic device array and allow for compact geometries to accommodate the arrangement of other components useful in a microfluidic device fluorescence microscope system.

In a first aspect, optical projection systems are described, such as optical projection systems for illuminating a planar surface. In some examples, the planar surface comprises a region of interest of a microscope system, such as a region of interest containing a microfluidic device array. An example optical projection system of this aspect comprises a light source directed to emit light along an emission axis, the emission axis oriented non-orthogonal to the planar surface; a shaping rod in optical communication with the light source, the shaping rod having a rod axis aligned along or parallel to the emission axis; and projection optics in optical communication with the shaping rod, the projection optics having a central axis that is offset from the emission axis and an output axis that is offset from the central axis.

Various different light sources can be used with the optical projection systems described herein. For example, the light source may have a circularly symmetric intensity profile, though other shapes of the intensity profile can be used. Optionally, the light source generates collimated light along the emission axis. For example, the light source can comprise an inherent emission source of collimated light (e.g., a laser source) or can include one or more optical elements (e.g., lenses or mirrors) for collimation of light from a non-collimated emission source. The light source can generally comprise any suitable arrangement or number of individual emission sources or optical elements, such as laser sources, light emitting diodes (LEDs), lenses, filters, windows, prisms, gratings, reflectors, waveguides, or the like. In some examples, the light source comprises one or more of a light emitting diode, a collimation lens, an optical filter, an optical filter wheel, or a coupling lens. Since the light source can be positioned at an angle with respect to the planar surface, multiple light sources may be used, such as where two light sources are positioned on opposite sides of the planar surface. In some cases, systems of this aspect may include or consist essentially of a single light source. Stated another way, example optical projection systems may not include a second light source or multiple light sources for illuminating the planar surface from more than one direction.

As noted above, the shaping rod can be positioned in optical communication with the light source, positioned to receive light emitted along an emission axis from the light source. The shaping rod can comprise a prism having any suitable cross-sectional shape and can modify the source intensity profile (e.g., a circular intensity profile) of light from the light source to another shape (e.g., a rectangular shape). Optionally, the shaping rod comprises a prism having a curved cross-sectional shape, such as a circular shape, an elliptical shape, an oval shape, or the like. Optionally, the shaping rod comprises a polygonal cross-sectional shape, such as a square, rectangular, rhombus, trapezoid, or the like. Use of a particular cross-sectional shape may be useful for adapting the shape of the output light to match the shape of a region of interest on the surface, for example. In some cases, a shaping rod with an elliptical cross-sectional shape can be useful for adapting the light to a circular shaped region of interest. In some cases, a shaping rod with a trapezoidal cross-sectional shape can be useful for adapting the light to a square or rectangular shaped region of interest. Optionally, a shaping rod with a trapezoidal cross-sectional shape is positioned for projecting light from the light source onto the planar surface with a rectangular shaped or square shaped profile.

The shaping rod can provide additional benefits. For example, the position of the shaping rod can impact the uniformity of the intensity profile of the projected light. In some cases, an offset between the shaping rod and the projection optics can impact the uniformity of the projected light. For example, when the shaping rod and the projection optics are offset, the uniformity of the intensity profile on a region of interest may be increased compared to configurations where the shaping rod and the projection optics are aligned (e.g., where a rod axis of the shaping rod and a central axis of the projection optics are aligned). In some examples, the offset between a rod axis of the shaping rod (or an emission axis of the light source) and the central axis of the projection optics may be from about 1 mm to about 20 mm, such as from 1 mm to 2 mm, from 2 mm to 3 mm, from 3 mm to 4 mm, from 4 mm to 5 mm, from 5 mm to 10 mm, from 10 mm to 15 mm, or from 15 mm to 20 mm. In some examples, the offset between the rod axis of the shaping rod and the central axis of the projection optics may be specified in terms of a fractional diameter of the projection optics or a percentage of the diameter of the projection optics. For example, the offset may be at least 25% of the diameter of the projection optics. Optionally, the offset may be at least 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50%, of the diameter of the projection optics. In some examples, the shaping rod is coupled to a mount, such as a mount allowing adjustment of the shaping rod position along the rod axis or perpendicular to the rod axis, and/or a mount allowing rotation of the shaping rod about the rod axis or the emission axis. Adjustment of rotation of the shaping rod about the rod axis may allow for adjustment of the orientation of the shape of the projected light profile on the planar surface. Adjustment of the position of the shaping rod perpendicular to the rod axis may allow for adjustment an offset between the rod axis and the central axis of the projection optics, for example.

In some cases, the shaping rod is positioned for projecting light from the light source onto an area of the planar surface with a uniformity ratio of 50% or more. As used herein, a uniformity ratio may correspond to a ratio of a minimum intensity to a maximum intensity. By adjusting the offset, the uniformity of the intensity of the projected can be adjusted, such as to increase the uniformity ratio as compared to the configuration where the shaping rod and the projection optics are aligned (e.g., where the offset is zero). In some examples, including a non-zero offset between the rod axis and the central axis of the projection optics can increase the uniformity ratio by 10% or more, 20% or more, or 30% or more, such as compared to a baseline uniformity ratio where the offset between the rod axis and the central axis of the projection optics is zero. Desirable uniformity ratios may be 50% or more, 60% or more, 70% or more, 80% or more, or 90% or more. In some cases, a uniformity ratio may be determined across a region of interest of the planar surface. In some cases, a uniformity ratio may be determined for different portions of the projected light, such as along one or more slices or sub-regions of the projected light. In some examples, a Y-axis uniformity ratio may be 50% or more. In some examples, an X-axis uniformity ratio may be 50% or more. Optionally, the uniformity ratio can be determined by sampling the intensity at different points across a region of interest, such as at four corners and a center of a rectangular region of interest and determining the uniformity ratio based on a minimum intensity and a maximum intensity in these regions.

The projection optics can comprise any suitable number and arrangement of optical components for projecting light emitted from the shaping rod onto the planar surface. As noted above, the central axis of the projection optics may be offset from the emission axis or the rod axis, such as by a distance of from 1 mm to 20 mm. The projection optics can comprise one or more lenses, such as one or more spherical lenses. Optionally, the projection optics can comprise other optical elements, such as one or more filters, windows, prisms, gratings, reflectors, waveguides, or the like.

In some implementations, positioning the rod axis (or emission axis) offset from the central axis of the projection optics may result in a lateral shift in the projected light at the planar surface as compared to a configuration where the rod axis (or emission axis) and the central axis are aligned. While such a configuration can improve the uniformity ratio of the projected light, the lateral shift in the projected light may be undesirable. In some cases, it may be possible to accommodate the lateral shift in the projected light by adjusting the position of the entirety of the optical projection system (e.g., the projection optics, the shaping rod, and the light source) in a direction opposite the lateral shift. In other cases, such an adjustment of the position of the entirety of the optical projection system may be limited or impractical, such as due to the presence of other components (e.g., a microscope). Inclusion of other optical components in the projection optics, however, can make up for this. For example, the projection optics may comprise a wedge prism, which may be positioned to shift input light oriented along or parallel to the central axis to output light oriented along another axis, referred to herein as an output axis. The wedge prism may redirect the light at the projection optics such that the output axis is offset angularly from the central axis, for example. The angular offset may result in a lateral shift in the projected light at the planar surface, which can be in a direction opposite to any lateral shift imparted by an offset between the central axis and the rod axis (or emission axis). In this way, the inclusion of a wedge prism can improve the position of the projected light. For example, the wedge prism can be positioned to align the output light over a center of the planar surface, which may not be feasible in some cases due to geometric constraints imposed by other system components. Optionally, the projection optics comprises a first lens on an input side of the wedge prism and a second lens on an output side of the wedge prism.

The projection optics may be coupled to a mount allowing rotation about the central axis or allowing translation along a direction perpendicular to the central axis and/or along a direction parallel to the central axis. The translation along a direction perpendicular to the central axis may allow for adjustment of the offset between the shaping rod and the central axis, as described above. The translation along a direction parallel to the central axis may allow for adjustment of a focus of the light projected onto the planar surface. Rotation about the central axis may allow for adjustment of a lateral position of the projected light on the planar surface.

The optical projection systems described herein may further comprise or be coupled to or used with a microscope system in optical communication with the planar surface for collecting scattered or emitted light from the planar surface. For example, the microscope system may have an optical axis oriented orthogonal or substantially orthogonal to the planar surface. The planar surface may comprise, retain, or be configured to retain a microfluidic or microarray device, such as a microfluidic device including a microfluidic array or a plurality of reaction sites distributed across the planar surface. Optionally, one or more flow controllers may be arranged to direct fluid flow in the microfluidic device. In some examples, a thermal block or thermocycling device may be coupled to the microfluidic device. Optionally, a system of this aspect may further comprise a temperature controller for adjusting a temperature of the microfluidic or microarray device using the thermocycling device. For example, temperature control and thermocycling may be useful, in embodiments, such as to drive polymerase chain reactions (PCR) for purposes of amplifying nucleic acids in the reaction sites.

The optical projection systems of this aspect may further comprise a translation or rotation stage, such as supporting at least the shaping rod and projection optics, and optionally the light source, for adjusting a relative position or orientation between the planar surface and the shaping rod and projection optics. Such a translation or rotation stage may allow for adjusting a size of the projected light on the planar surface or a lateral position of the projected light on the planar surface.

In another aspect, methods are described herein, such as methods for illuminating a planar surface. An example method of this aspect comprises directing light from a light source along an emission axis, the emission axis oriented non-orthogonal to the planar surface; passing the light through a shaping rod, the shaping rod having a rod axis aligned along the emission axis; passing the light through projection optics, the projection optics having a central axis that is offset from the emission axis and an output axis that is offset from the central axis; and directing the light from projection optics onto the planar surface.

As described above, a variety of light source configurations can be used. Optionally, the light from the light source has a circularly symmetric intensity profile. Optionally, the light source generates collimated light along the emission axis. Optionally, the light source comprises one or more of a light emitting diode, a collimation lens, an optical filter, an optical filter wheel, or a coupling lens.

The light from the light source may be used in fluorescence microscopy, for example. In some cases, it may be useful to use multiple different wavelengths of light for excitation of different fluorophores. For example, the light from the light source may have a first wavelength or wavelength range and methods of this aspect may further comprise directing additional light from the light source along the emission axis, the additional light having a second wavelength or wavelength range.

As described above, a variety of different shaping rod configurations can be used. Optionally, the shaping rod comprises a prism having a curved cross-sectional shape, such as a circular shape or an elliptical shape, for example. Optionally, the shaping rod and projection optics are positioned for projecting the light onto the planar surface with a y-axis uniformity ratio of 50% or more and an x-axis uniformity ratio of 50% or more. Optionally, the shaping rod comprises a prism having a polygonal cross-sectional shape, such as a trapezoidal cross-sectional shape. Optionally, the shaping rod and projection optics are positioned for projecting the light onto the planar surface with a rectangular shape or a square shape. Optionally, the light projected onto the rectangular shape or square shape has a y-axis uniformity ratio of 50% or more and an x-axis uniformity ratio of 50% or more. Optionally, the shaping rod is coupled to a mount allowing rotation of the shaping rod about the rod axis or the emission axis. Methods of this aspect may further comprise adjusting a shape or shape orientation of the light projected onto the planar surface by adjusting a rotation of the shaping rod about the rod axis or the emission axis.

As described above, a variety of different projection optics configurations can be used. Optionally, the projection optics comprise one or more lenses, such as one or more spherical lenses. Optionally, the projection optics comprise a wedge prism positioned to shift input light oriented along or parallel to the central axis to output light oriented along the output axis. In some examples, the projection optics comprise a first lens on an input side of the wedge prism and a second lens on an output side of the wedge prism. Optionally, the projection optics are coupled to a mount allowing rotation of the projection optics about the central axis or allowing translation of the projection optics along a direction perpendicular to the central axis. In some examples, a method of this aspect may further comprise adjusting a focus of the light projected onto the planar surface by adjusting translation of the projection optics along the direction perpendicular to the central axis. In some examples, a method of this aspect may further comprise adjusting a lateral position of the light projected onto the planar surface by adjusting rotation of the projection optics about the central axis. Optionally, the projection optics comprise a wedge prism and adjusting rotation of the projection optics about the central axis modifies an orientation of a shift imparted by the wedge prism.

The described methods may be used in a variety of different configurations. In some examples, the planar surface comprises a region of interest of a microscope system. For example, methods of this and wherein the method further comprises collecting and imaging light scattered or emitted from the planar surface using the microscope system. Optionally, the planar surface comprises a microfluidic or microarray device. In some examples, methods of this aspect may further comprise cycling a temperature at the microfluidic device between one or more different temperatures. Optionally, the microfluidic device comprises a microfluidic array or a plurality of reaction sites distributed across the planar surface. Optionally the method may further include controlling the flow of samples and reagents in the microfluidic device prior to cycling the temperature.

In another aspect, embodiments of the present invention provide apparatus and systems for supplying controlled pressure to a microfluidic device. An apparatus can include, for example, a holder configured to couple with a microfluidic device, a plurality of accumulators for supplying controlled pressure to the microfluidic device, and a pressure regulator for selectively regulating pressure supplied to each of the plurality of accumulators. In some embodiments, the pressure regulator includes an accumulator selector valve. In some embodiments, the pressure regulator employs rotary motion. In some embodiments, an apparatus for supplying controlled pressure includes one or more first supply outlet selector valves for selectively placing a first supply outlet in fluid communication with one of the plurality of accumulators. In some embodiments, an apparatus for supplying controlled pressure includes one or more second supply outlet selector valves for selectively placing a second supply outlet in fluid communication with one of the plurality of accumulators. In some embodiments, a first supply outlet selector valve includes a rotary valve. In some embodiments, a second supply outlet selector valve includes a rotary valve. A system can include, for example, any of the above described apparatus and a control unit for controlling the operation of the pressure regulator. In some embodiments, the system can control one or more accumulator selector valves, and one or more supply outlet selector valves.

In some embodiments, a variety of devices and methods for conducting microfluidic analyses are utilized herein, including devices that can be utilized to conduct thermal cycling reactions such as nucleic acid amplification reactions. The devices can differ from conventional microfluidic devices in that they can include elastomeric components such as deflectable membranes that can form valves; in some instances, much or all of the device is composed of elastomeric material. For example, amplification reactions can be linear amplifications, (amplifications with a single primer), as well as exponential amplifications (e.g., amplifications conducted with a forward and reverse primer set).

A variety of matrix or array-based devices are also utilized in some embodiments. Certain of these devices include: (i) a first plurality of flow channels formed in an elastomeric substrate, (ii) a second plurality of flow channels formed in the elastomeric substrate that intersect the first plurality of flow channels to define an array of reaction sites, (iii) a plurality of isolation valves disposed within the first and second plurality of flow channels that can be actuated to isolate solution within each of the reaction sites from solution at other reaction sites, and (iv) a plurality of perimeter guard channels surrounding one or more of the flow channels and/or one or more of the reaction sites to inhibit evaporation of solution therefrom. The foregoing devices can be utilized to conduct a number of different types of reactions, including those involving temperature regulation (e.g., thermocycling of nucleic acid analyses).

In some embodiments, microfluidic devices may contain blind flow channels which include a region that functions as a reaction chamber or reaction site. Blind flow, or blind fill, can refer to the filling of a dead-end tube or flow channel with a liquid where a head of gas is pushed in front of the liquid bolus, and where that head of gas is vented or otherwise released from the flow channel, allowing the dead-end flow channel to fill fully with the liquid. In some embodiments, polydimethylsiloxane (PDMS) can be used as an elastomeric material. PDMS is sufficiently gas permeable that liquid pressurized at a few psi can drive the gas out of the channels, leaving them completely filled with liquid.

In some examples, methods of this aspect may further comprise adjusting a lateral position of the light projected onto the planar surface by adjusting a relative orientation between the planar surface and the shaping rod and projection optics. In some examples, methods of this aspect may further comprise adjusting an area of the light projected onto the planar surface by adjusting a relative distance between the planar surface and the shaping rod and projection optics.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION

Figure 1:
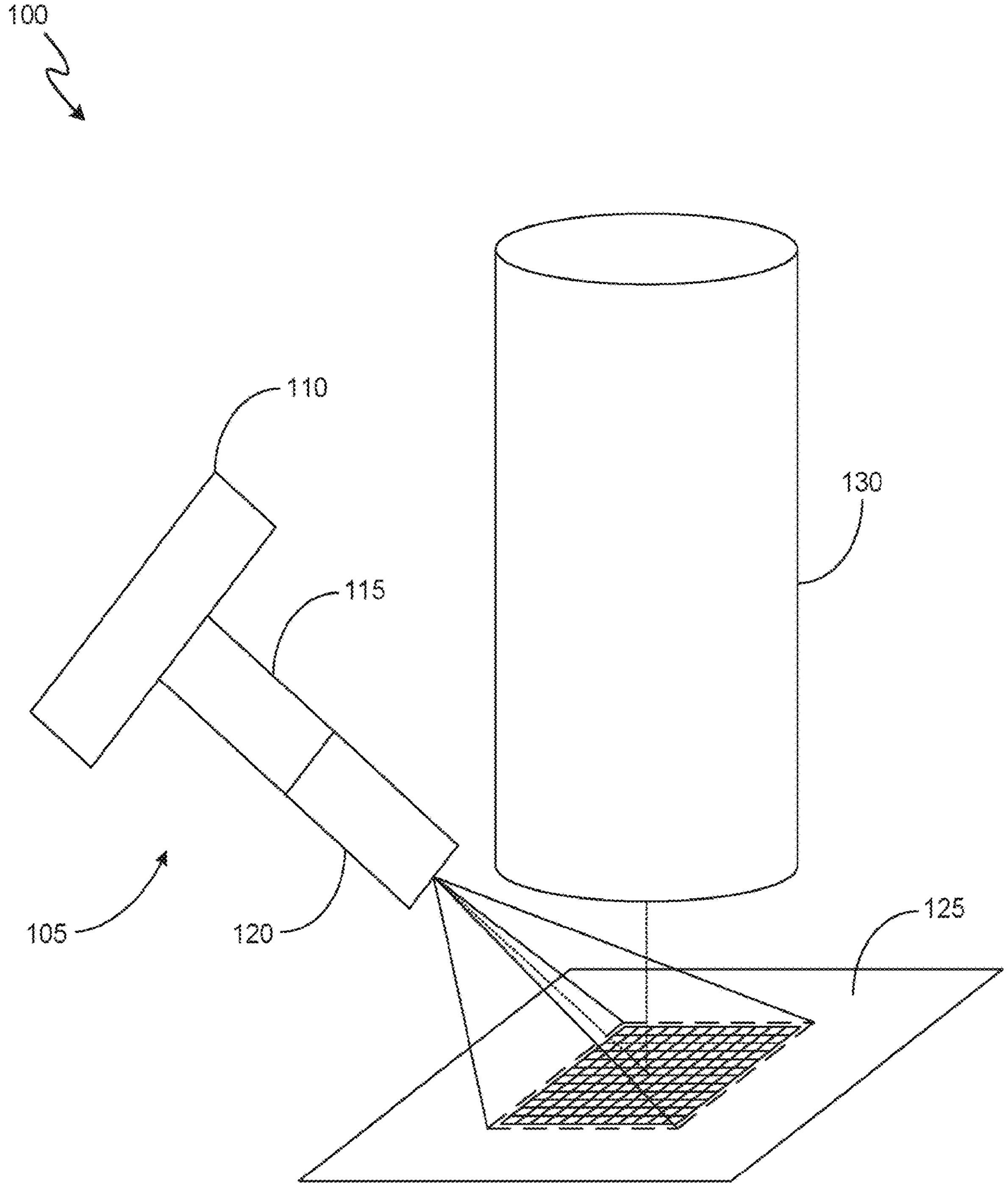
FIG. 1 provides a schematic illustration of an example projection and imaging system in accordance with embodiments described herein.

Systems and associated methods and techniques for illuminating a planar surface, such as a microfluidic device array (e.g., a planar array of reaction sites within the microfluidic device), are described herein. While some embodiments herein describe a microfluidic device, any suitable device, such as a microarray, may be used. Geometries where an optical source that illuminates the planar surface at an oblique angle can be used to accommodate other imaging, microfluidic, and thermal cycling components, for example, while still providing a compact and dynamically adjustable system. Certain optical components and their arrangements, for example an offset optical shaping rod and a wedge prism, can be used to provide uniform illumination across the planar surface and allow the illumination to appropriately reach the target illumination area despite the geometric limitations imposed by the presence and position of imaging, microfluidic, and thermal cycling components.

In general the terms and phrases used herein have their art-recognized meaning, which can be found by reference to standard texts, journal references and contexts known to those skilled in the art. The following definitions are provided to clarify their specific use in the context of the invention.

As used herein a "planar surface" refers to a light-receiving area or component which is generally flat, and may include a microfluidic device or microarray. A planar surface can include surfaces that deviate from planarity but which are designed to be flat or to have a planar or non-curved shape. A planar surface can also include some regions that have local curvature, but have an overall flat shape. In some examples, a planar surface can have an infinite radius of curvature, but a non-infinite radius of curvature can be considered planar herein, such as a relatively small area having a relatively large radius of curvature. As an example, a 10 cm×10 cm area having a radius of curvature of or greater than about 10 m can be considered planar in some cases.

"Shaping rod" refers to an optical element, which may be considered a lens, prism, or waveguide, having an elongated shape, such as where a length is greater than a cross-sectional dimension. In general, shaping rods have a uniform cross-sectional shape, such as a circular shape, oval shape, elliptical shape, or a polygon shape (e.g., square, rectangle, pentagon, hexagon, trapezoid, etc.), but shaping rods with nonuniform cross-sectional shapes can be used in some circumstances. A shaping rod can have a "rod axis," referring to a direction parallel to or along a length or longest dimension of the rod. Faces of a shaping rod can be highly polished and generally orthogonal to a length or longest dimension of the rod. In the present description, a shaping rod can receive input light on an end face and optically couple the light to and transmit output light from an opposite end face. In some examples, a shaping rod can be used to change the shape of an intensity profile of light received on one face to a different shape for the output light from an opposite end face. In some examples, light received by a shaping rod can have a circularly symmetric intensity profile and the shaping rod can change the output intensity profile to a non-circularly symmetric intensity profile.

FIG. 1 provides a schematic illustration of an example system 100 for projecting light onto and imaging a surface. As illustrated, system 100 includes an optical projection system 105, comprising a light source 110, a shaping rod 115, and projection optics 120. Optical projection system is positioned to project light onto a planar surface 125. System 100 also includes a microscope 130, which can comprise one or more lenses, filters, cameras or other imaging devices, or the like, for imaging or collecting light from planar surface 125.

Light source 110 can optionally comprise a source of white light, such as one or more white light emitting diodes, or can comprise a source of narrow-band light, such as one or more colored light emitting diodes or laser sources. In some cases, light source 110 can include one or more filters, such as in a filter wheel configuration, allowing for selection of a specific range of wavelengths of output light from light source 110. Light source 110 can also include one or more lenses or other optical components, such as reflectors, waveguides, prisms, etc., to allow for shaping and focusing light output by light source 110. In some examples, light source 110 can include a collimation lens and a focusing lens, such as for coupling light output by light source 110 into shaping rod 115.

Light output by projection optics 120 can be directed at an oblique angle towards planar surface 125 and can be focused and projected to illuminate a region of interest of planar surface 125. For example, when the region of interest has a specific shape, it may be useful to match the shape of the projected light to the shape of the region of interest, and shaping rod 115 can be useful for controlling a shape of the output projected light. For example, when the region of interest of planar surface 125 is rectangular or square shaped, it may be desirable for the shape of the projected light to be rectangular or square shaped. Since light output by projection optics 120 is directed at an oblique angle towards planar surface 125, the incidence angle can be accounted for.

Planar surface 125 may comprise a flow cell or a microfluidic array, for example, containing a plurality of reaction sites. In some cases, microscope 130 is a fluorescence microscope, positioned to obtain fluorescent light emitted by compositions present in a microfluidic array, so it may be desirable for light output by projection optics 120 to be primarily directed onto the region of interest of the planar surface 125 so as to maximize the intensity of light that can be received at the reaction sites to allow for more intensity of collected fluorescent light by microscope 130. In order to quantitatively compare the intensity of fluorescent light emitted across different reaction sites in the microfluidic array, it may be desirable for the intensity of light output by projection optics 120 and received at planar surface 125 to have a uniform intensity distribution, as will be described in further detail below.

Figure 2A:
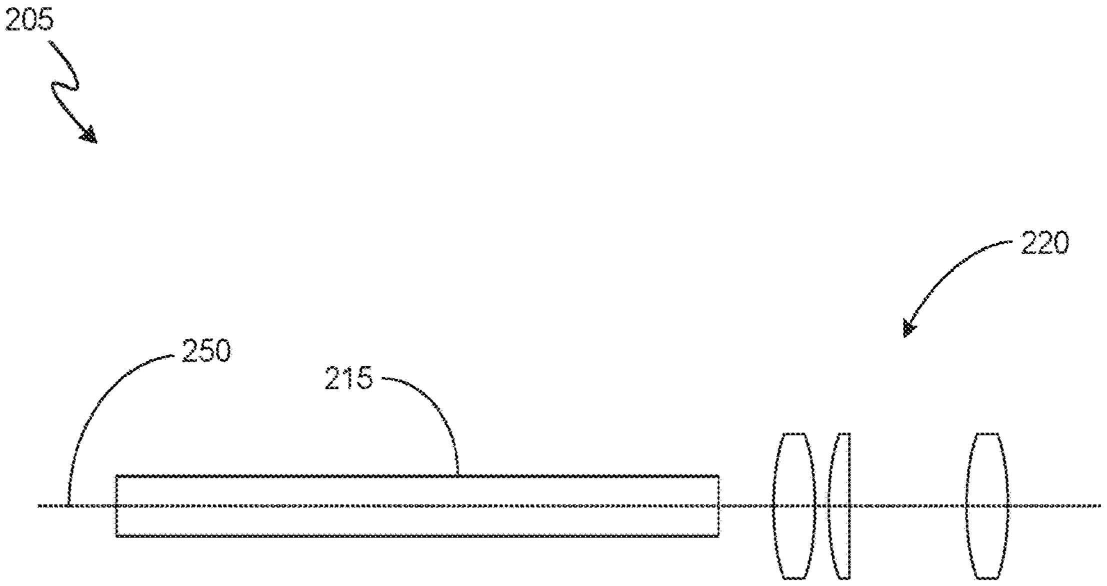
FIG. 2A shows a schematic illustration of an example arrangement of components of an optical projection system in accordance with some embodiments and FIG. 2B shows illustrative results of an example raytracing simulation using an optical projection system similar to that depicted in FIG. 2A.

FIG. 2A shows a schematic illustration of an example arrangement of components of an optical projection system 205, namely a shaping rod 215 and projection optics 220. Projection optics 220 includes a plurality of lenses, which may be spherical lenses, depicted in FIG. 2A as two biconvex lenses and a plano-convex lens. It will be appreciated that the arrangement of lenses shown for projection optics 220 is merely one example and that any desirable arrangement of lenses, reflectors, prisms, filters, waveguides, or the like may be included in projection optics 220. FIG. 2A also shows an axis 250, aligned through the centers of shaping rod 215 and the lenses of projection optics 220. Since the centers of shaping rod 215 are aligned along a common axis in the configuration shown in FIG. 2A, only a single axis 250 is shown, and axis 250 may correspond to an emission axis of output light, such as from a light source (not shown) and received by shaping rod 215, a rod axis of shaping rod 215, or a central axis of projection optics 220.

Figure 2B:
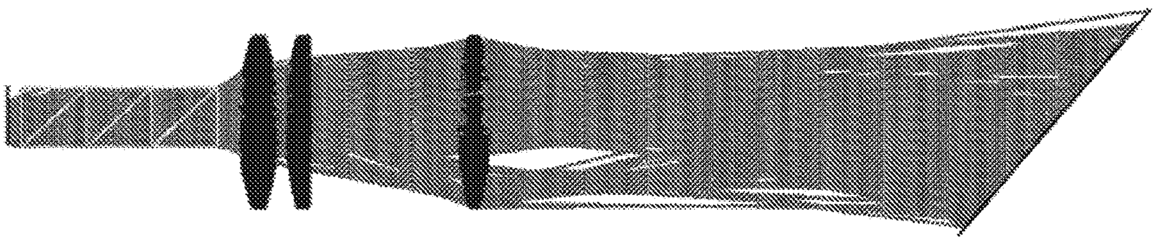
Figure 3A:
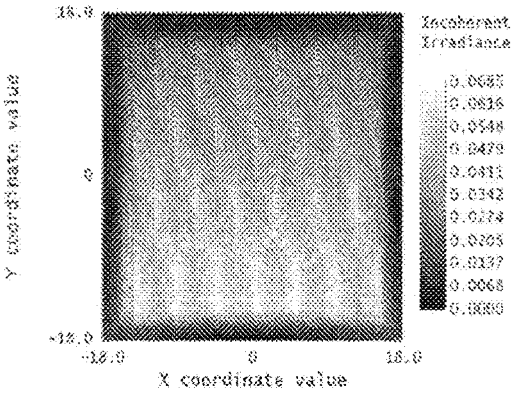
FIG. 3A and FIG. 3B provide quantitative results of the example raytracing simulation depicted in FIG. 2B.
Figure 3B:
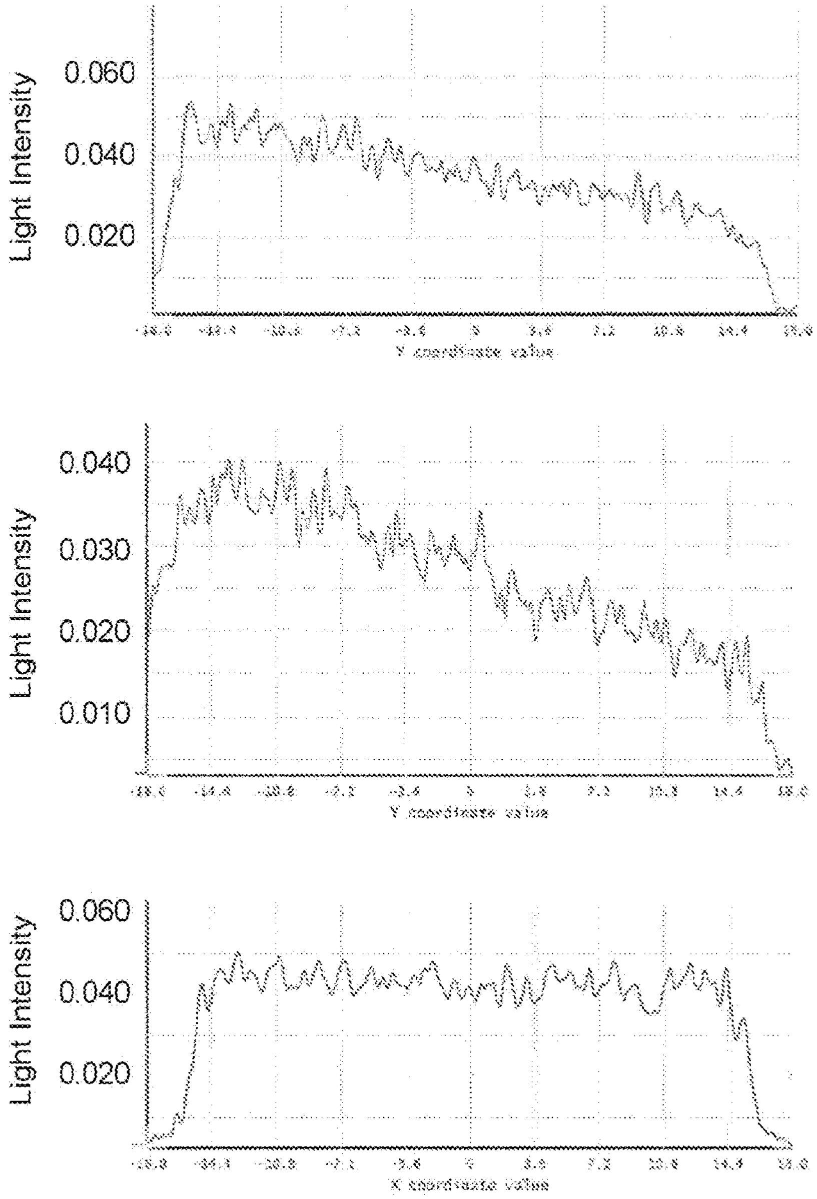

FIG. 2B shows illustrative results of an example raytracing simulation of projection of light onto a planar surface at an oblique angle using an optical projection system similar to that depicted in FIG. 2A, including a shaping rod with a trapezoidal cross-sectional shape and a rod axis aligned parallel to (e.g., along) an emission axis of an optical source, and projection optics including three spherical lenses (two biconvex lenses and a plano-convex lens). The raytracing simulation allows for an estimation of the intensity distribution received across a region of interest of the planar surface based on the optical configuration, which is shown in FIG. 3A. Advantageously, the use of a shaping rod with a trapezoidal cross-sectional shape provides good coverage of a rectangular or approximately square-shaped region of interest by the output light, though the irradiance shown in FIG. 3A appears somewhat brighter on the top side (high Y coordinate values) as compared to the bottom side (low Y coordinate values). FIG. 3B provides plots of the intensity for two separate vertical slices (top panel in FIG. 3B shows intensity as a function of Y coordinate value for an X coordinate value of about 0; middle panel in FIG. 3B shows intensity as a function of Y coordinate value for an X coordinate value of about −15) and for a single horizontal slice (bottom panel in FIG. 3B shows intensity as a function of X coordinate value for a Y coordinate value of 0), indicating that the uniformity from side-to-side is relatively good, but that the uniformity from top-to-bottom is relatively worse.

As noted above, it can be desirable to have uniform light distribution across a region of interest of the planar surface. The region of interest may be greater than 0.1 $cm^2$, greater than 1 $cm^2$, or greater than 10 $cm^2$, such as between 1 $cm^2$ and 100 $cm^2$. Uniformity of light can be described herein by a uniformity ratio, which can reflect a degree to which intensity differs across a region of interest by comparing a minimum intensity to a maximum intensity. In some examples, a uniformity ratio of 50% or more can be desirable. Optionally, a uniformity ratio may be above 50% or above 60%, such as from 50% to 100%, from 60% to 100%, from 70% to 100%, or from 80% to 100%. Uniformity ratios can be determined at various points on an X-axis or a Y-axis in a region of interest, such as represented in FIG. 3B, across an entirety of a region of interest, by comparing various points sampled across the region of interest (e.g., four corners and center), or the like. In the plots shown in FIG. 3B, the Y-axis uniformity is about 42%, while the X-axis uniformity is greater than 85%.

To improve the uniformity of the light projected onto the planar surface at an oblique angle over the optical projection system depicted in FIG. 2A, geometric and/or structural changes can be made. In some examples, a second optical projection system can be used, such as identical or substantially identical to the optical projection system described herein except that it could be arranged at a different position relative to the planar surface. Turning back briefly to the configuration shown in FIG. 1, such a second optical projection system could be positioned on an opposite side of microscope 130 as optical projection system 105. Including a second optical projection system, however, will increase the alignment requirements and complexity of the system, increasing the overall part count and taking up space, which can be limited in some implementations. Accordingly, some systems described herein can include those including, containing, consisting of, or consisting essentially of a single optical projection system, as opposed to multiple optical projection systems.

In other examples, the uniformity can be changed by adjusting the relative position of the shaping rod and the projection optics, optionally without making other structural changes (e.g., including another optical element in a projection optics). For example, by placing an offset between the shaping rod and the projection optics, the uniformity can be improved. Specifically, a rod axis of the shaping rod can be offset from a central axis of the projection optics, such as while still having the rod axis and the central axis being parallel or substantially parallel to one another.

Figure 4A:
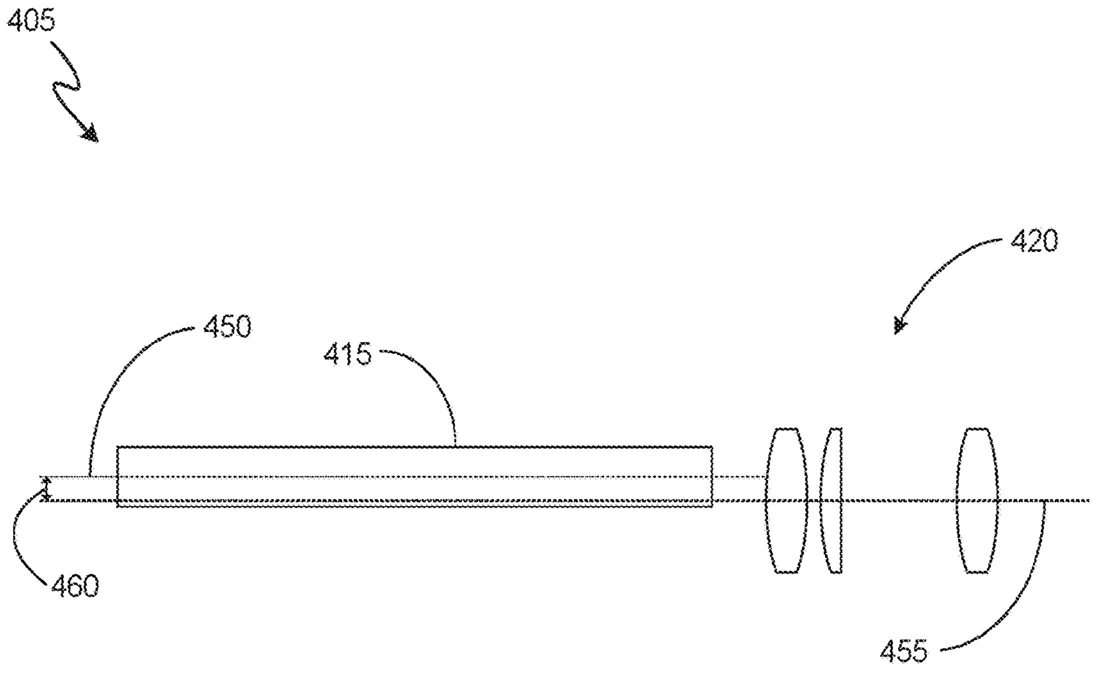
FIG. 4A shows a schematic illustration of an example arrangement of components of an optical projection system in accordance with some embodiments and FIG. 4B shows illustrative results of an example raytracing simulation using an optical projection system similar to that depicted in FIG. 4A.

FIG. 4A shows a schematic illustration of an example arrangement of components of an optical projection system 405, including a shaping rod 415 and projection optics 420. Projection optics 420 includes a plurality of lenses, which may be spherical lenses. FIG. 4A also shows a first axis 450, aligned through the center of shaping rod 415 and corresponding to a rod axis, and a second axis 455, aligned through the lenses of projection optics 420 and corresponding to a central axis of the projection optics 420. An offset 460 between the rod axis and the central axis is indicated in FIG. 4A. Depending on the specific implementation, the offset amount can be relatively small. For example, the offset amount can be from about 1 mm to about 20 mm, such as from 1 mm to 2 mm, from 2 mm to 3 mm, from 3 mm to 4 mm, from 4 mm to 5 mm, from 5 mm to 6 mm, from 6 mm to 7 mm, from 7 mm to 8 mm, from 8 mm to 9 mm, from 9 mm to 10 mm, from 10 mm to 11 mm, from 11 mm to 12 mm, from 12 mm to 13 mm, from 13 mm to 14 mm, from 14 mm to 15 mm, from 15 mm to 16 mm, from 16 mm to 17 mm, from 17 mm to 18 mm, from 18 mm to 19 mm, or from 19 mm to 20 mm.

Figure 4B:
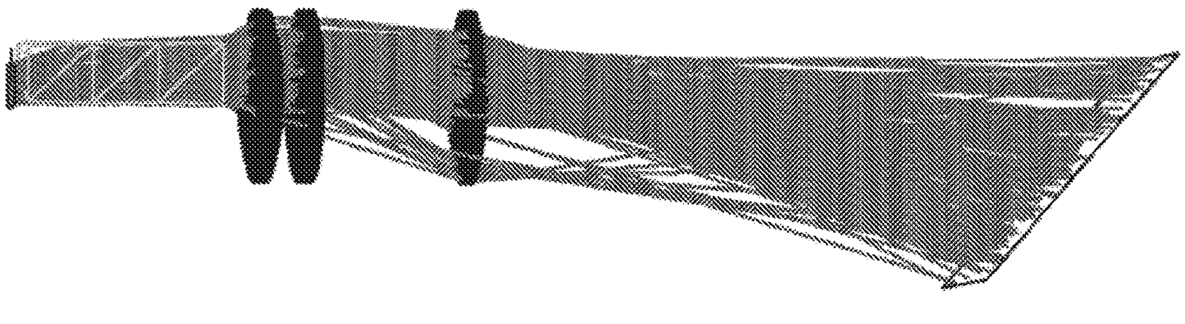
Figure 5A:
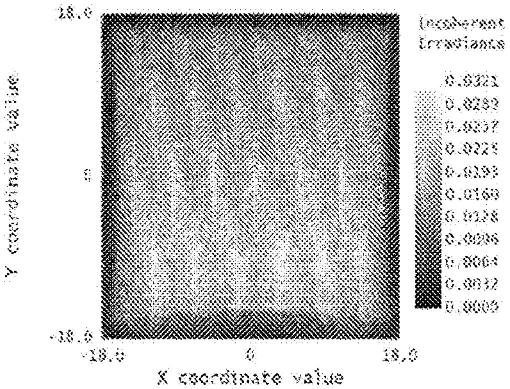
FIG. 5A and FIG. 5B provide quantitative results of the example raytracing simulation depicted in FIG. 4B.
Figure 5:
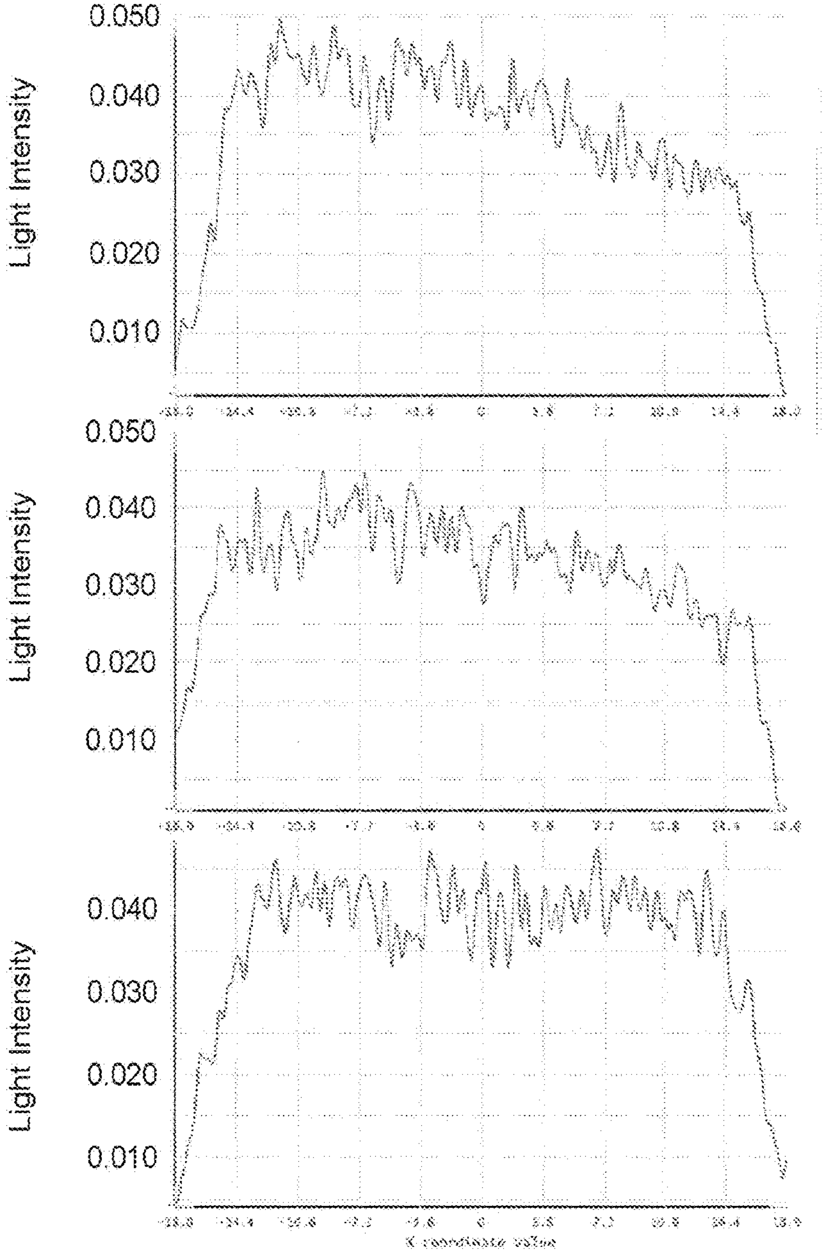

FIG. 4B shows illustrative results of an example raytracing simulation of projection of light onto a planar surface at an oblique angle using an optical projection system similar to that depicted in FIG. 4A, including a shaping rod with a trapezoidal cross-sectional shape and a rod axis aligned parallel to (e.g., along) an emission axis of an optical source, and projection optics including three spherical lenses (two biconvex lenses and a plano-convex lens), with an offset between a rod axis of the shaping rod and the central axis of the projection optics. An estimated intensity distribution from the raytracing simulation is shown in FIG. 5A with plots of intensity provided in FIG. 5B (top panel in FIG. 5B shows intensity as a function of Y coordinate value for an X coordinate value of about 0; middle panel in FIG. 5B shows intensity as a function of Y coordinate value for an X coordinate value of about −15; bottom panel in FIG. 5B shows intensity as a function of X coordinate value for a Y coordinate value of 0). Again, the use of a shaping rod with a trapezoidal cross-sectional shape provides good coverage of a rectangular or approximately square-shaped region of interest by the output light, with a more uniform intensity shown in FIG. 5A from top to bottom side as compared to that shown in FIG. 3A. The plots of intensity shown in FIG. 3B again indicate that the uniformity from side-to-side remains relatively good (e.g., uniformity ratio above about 85%), with the top-to-bottom uniformity ratio improved to about 62%.

Figure 6:
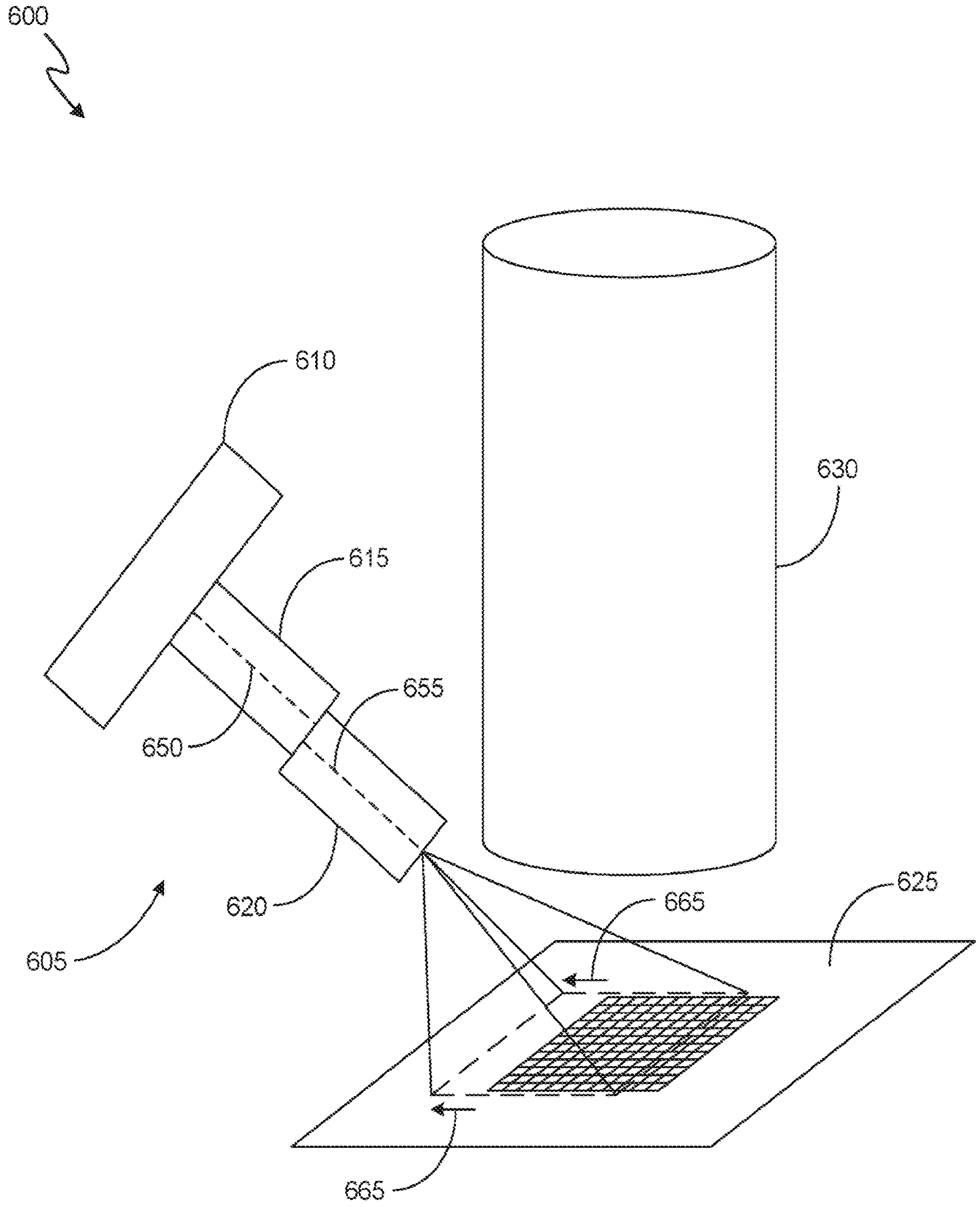
FIG. 6 provides a schematic illustration of an example projection and imaging system in accordance with embodiments described herein, and depicting a shift in projection when components are offset.

Although using an offset between the shaping rod and the projection optics, a uniformity of the projected light can be improved, such an effect may be accompanied by other changes. For example, in some cases, the output light projected by the projection optics can end up being shifted on the planar surface. FIG. 6 provides a schematic illustration of an example system 600 for projecting light onto and imaging a surface. As illustrated, system 600 includes an optical projection system 605, comprising a light source 610, a shaping rod 615, and projection optics 620 in which an offset is provided between a rod axis 650 of shaping rod 615 and a central axis 655 of projection optics 620. Due to the offset between rod axis 650 and central axis 655, the projected output light undergoes a shift 665 at the planar surface 625, as indicated by the arrows, which may result in the projected output light no longer being sufficiently positioned over the region of interest.

Various implementations can be used to shift the projected output light back over the region of interest when an offset between rod axis 650 and central axis 655 is used. In some implementations, the entire optical projection system 605 can be shifted opposite to the direction of the shift 665. However, in some cases, such a shift of optical projection system 605 may be limited by other components of system 600, such as by microscope 630, so it may be undesirable or impractical to shift optical projection system 605 a sufficient amount to accommodate the shift 665 imparted due to the offset between rod axis 650 and central axis 655.

Figure 7A:
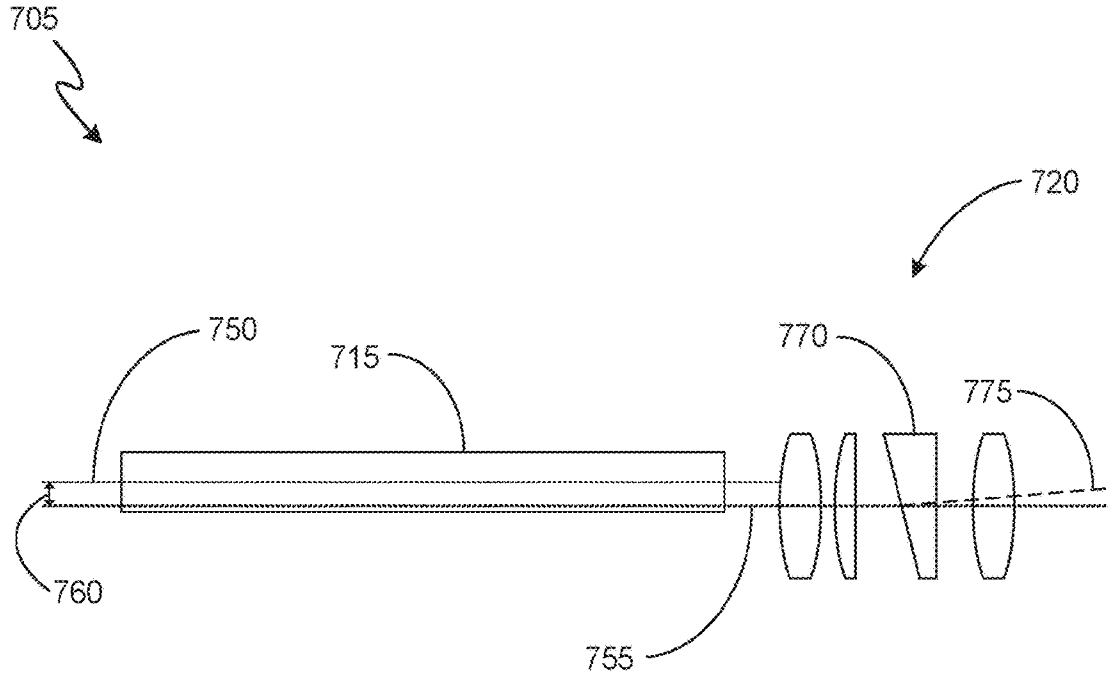
FIG. 7A shows a schematic illustration of an example arrangement of components of an optical projection system in accordance with some embodiments and FIG. 7B shows illustrative results of an example raytracing simulation using an optical projection system similar to that depicted in FIG. 7A.

In some implementations, the projection optics can be altered to achieve a shift in the projected output light. For example, FIG. 7A shows a schematic illustration of an example arrangement of components of an optical projection system 705, including a shaping rod 715 and projection optics 720. FIG. 7A also shows a first axis 750, aligned through the center of shaping rod 715 and corresponding to a rod axis, and a second axis 755, aligned through the lenses of projection optics 720 and corresponding to a central axis of the projection optics 720. An offset 760 between the rod axis and the central axis is indicated in FIG. 7A. Projection optics 720 includes a plurality of lenses, which may be spherical lenses, and a wedge prism 770. Wedge prism 770 can be arranged as illustrated between a plano-convex lens and a biconvex lens, or in other positions. Wedge prism 770 can be oriented in such a way as to direct output axis 775 in a suitable direction to reduce or eliminate the shift effect, described above with reference to FIG. 6, caused by the offset 760 between the rod axis and the central axis.

Figure 7B:
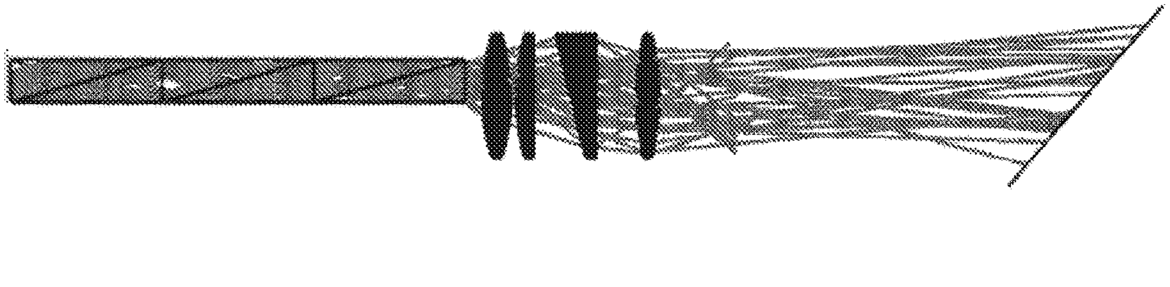
Figure 8A:
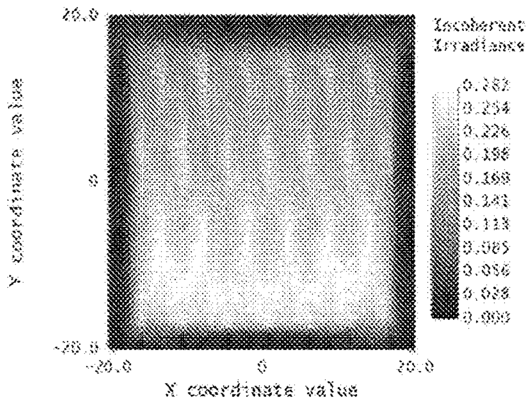
FIG. 8A and FIG. 8B provide quantitative results of the example raytracing simulation depicted in FIG. 7B.
Figure 8B:
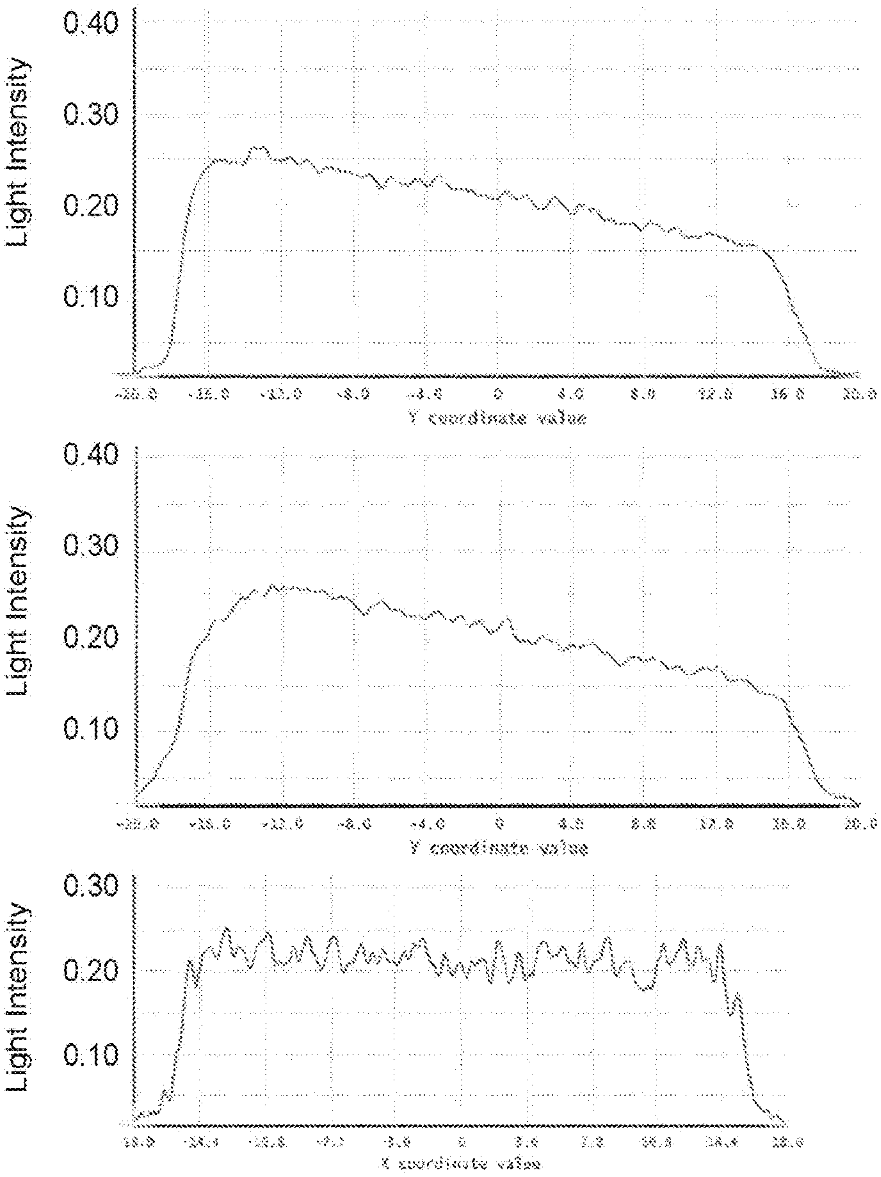

FIG. 7B shows illustrative results of an example raytracing simulation of projection of light onto a planar surface at an oblique angle using an optical projection system similar to that depicted in FIG. 7A, including a shaping rod with a trapezoidal cross-sectional shape and a rod axis aligned parallel to (e.g., along) an emission axis of an optical source, and projection optics including three spherical lenses (two biconvex lenses and a plano-convex lens) and a wedge prism, with an offset between a rod axis of the shaping rod and the central axis of the projection optics. An estimated intensity distribution from the raytracing simulation is shown in FIG. 8A with plots of intensity provided in FIG. 8B (top panel in FIG. 8B shows intensity as a function of Y coordinate value for an X coordinate value of about 0; middle panel in FIG. 8B shows intensity as a function of Y coordinate value for an X coordinate value of about −15; bottom panel in FIG. 8B shows intensity as a function of X coordinate value for a Y coordinate value of 0). The plots of intensity shown in FIG. 8B again indicate that the uniformity from side-to-side remains relatively good (e.g., uniformity ratio above about 85%), with the top-to-bottom uniformity ratio at about 60%.

Figure 9:
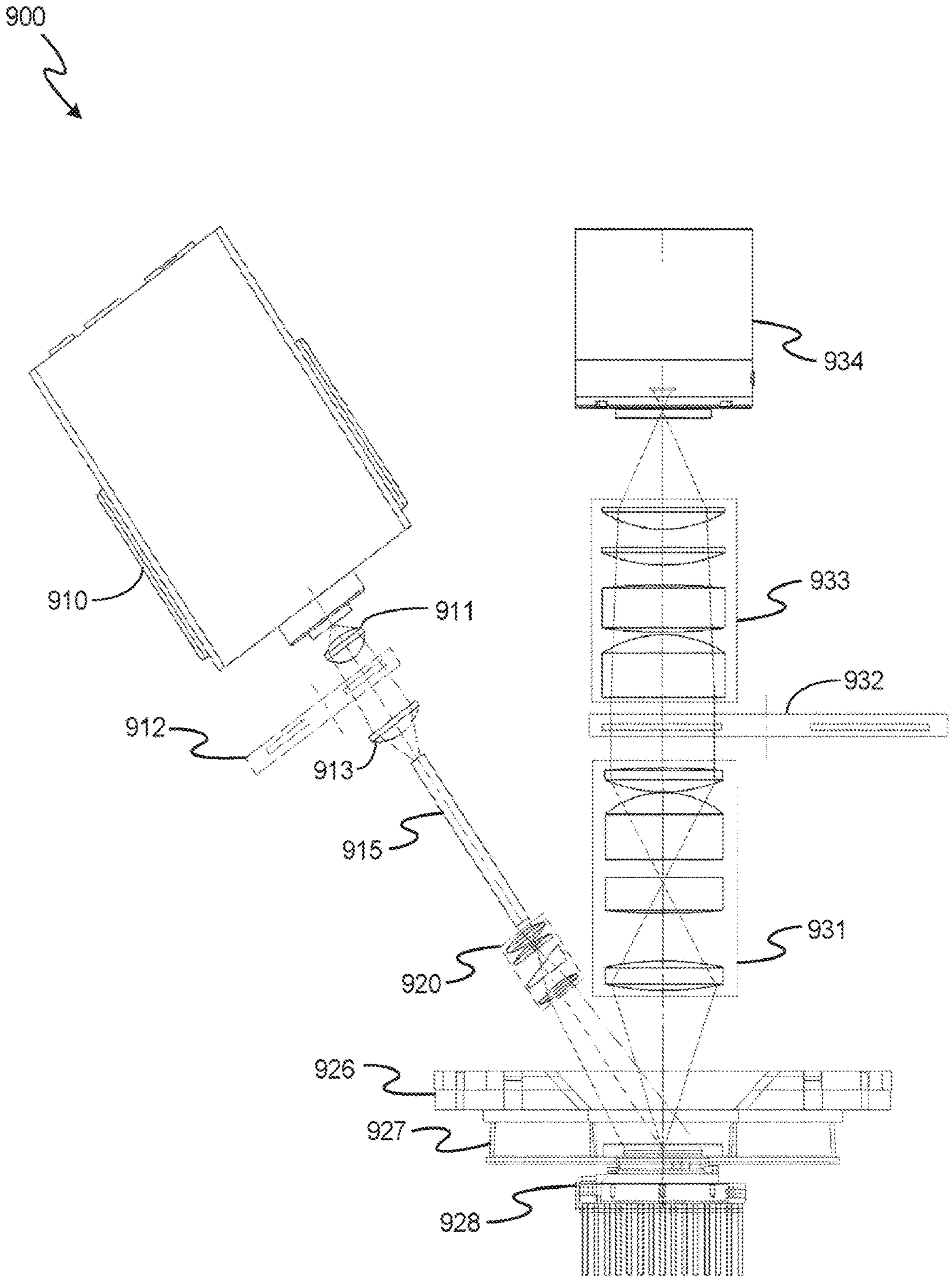
FIG. 9 provides a schematic illustration of an example projection and imaging system in accordance with embodiments described herein, showing projection system details, microscope system details, and microfluidic device details.

FIG. 9 provides a schematic illustration of another example system 900, showing additional details. System 900 includes an optical projection system, comprising a white light source 910, a collimator 911, a filter wheel 912, a coupling lens 913, a shaping rod 915, and projection optics 920 including three lenses and a wedge prism, where an offset is provided between a rod axis of shaping rod 915 and a central axis of projection optics 920. System 900 also includes a microscope including a lower set of collection lenses 931, a filter wheel 932, an upper set of collection lenses 933, and a camera 934.

System 900 also includes a pneumatic block 926 interfaced to a microfluidic chip 927, which can include a planar surface with an array of reaction sites for receiving light from projection optics 920. Microfluidic chip 927 can provide sites for a plurality of different reactions which can be probed using system 900. With an array configuration available, various active ingredients, concentrations, or other aspects can be varied across the array, allowing for different reaction conditions at each reaction site in the array to be evaluated at the same time. For example, light from the light source can be optionally filtered and directed to microfluidic chip to illuminate compositions present in the reaction sites. The configuration shown, including the microscope, can be useful for imaging fluorescence from the compositions (e.g., reactants or products) present in the reaction sites in response to the illumination.

System 900 also includes a thermal block 928 allowing for temperature control over microfluidic chip 927. In some cases, thermal block 928 includes a Peltier device and a heat sink, for example. Thermal block 928 can be useful for controlling the temperature of the microfluidic chip 927, such as for purposes of thermal cycling to drive polymerase chain reactions (PCR) for purposes of amplifying nucleic acids. The presence of thermal block 928 can, in some cases, impose limitations on the positioning of illuminating optics. For example, when thermal block 928 is present, this can prevent, block, or otherwise make bottom illumination inconvenient. Additional details of microfluidics and thermal cycling systems can be found in U.S. Pat. Nos. 8,105,553, 8,389,960, 9,316,331, 9,371,965, 10,106,846, 10,131,934, and 10,226,770, for example, which are hereby incorporated by reference.

Figure 10A:
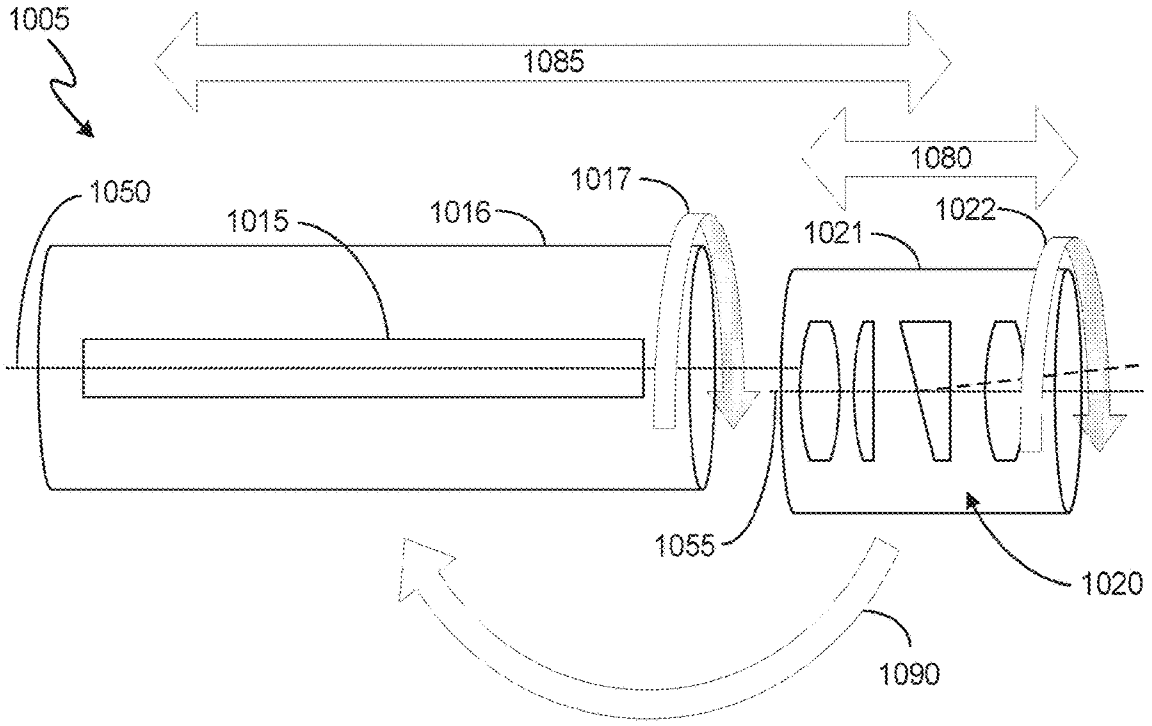
FIG. 10A provides a schematic illustration of an example optical projection system 1005, showing various adjustments that can be made and FIG. 10B schematically illustrates different ways that projected light can be adjusted using the adjustments indicated in FIG. 10A.
Figure 10B:
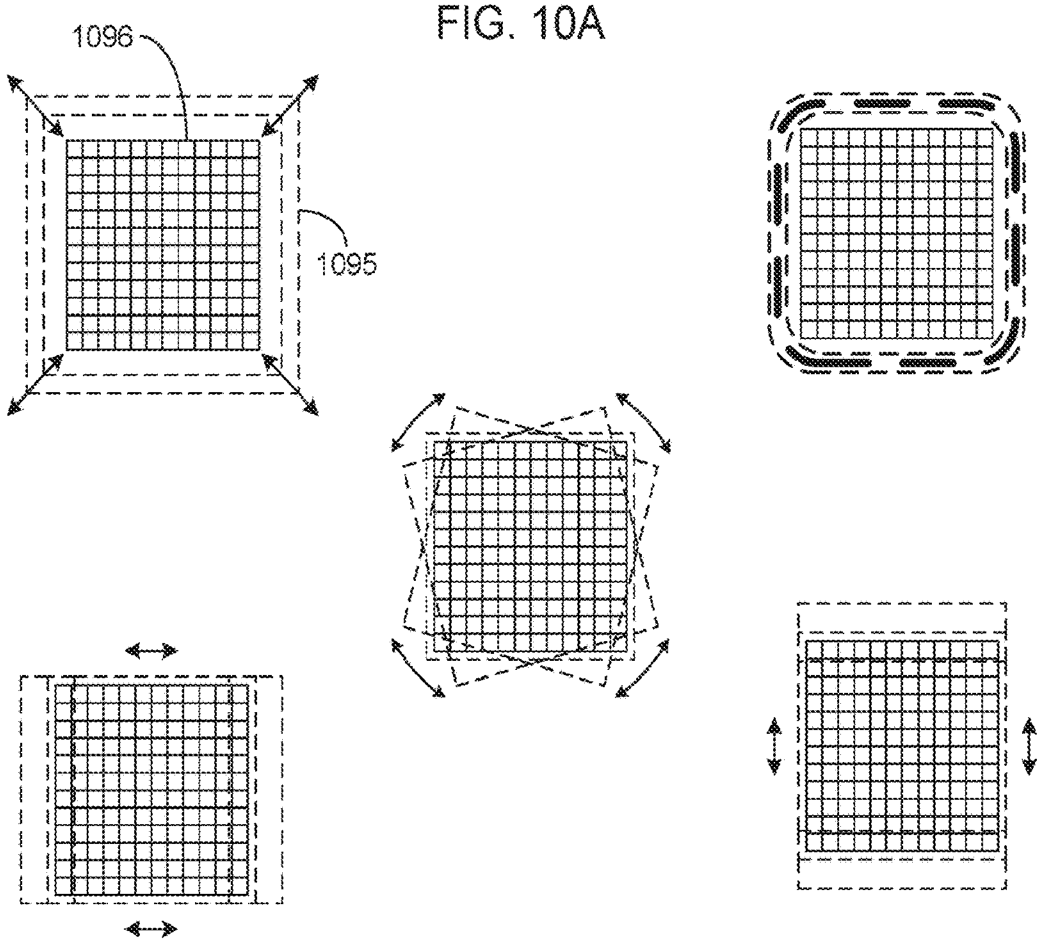

The arrangement of components of an optical projection system can advantageously allow for various adjustments of the light projected onto a planar surface. FIG. 10A provides a schematic illustration of an example optical projection system 1005, showing various adjustments that can be made. These adjustments can result in changing the size, position, focus, and/or orientation of light projected by optical projection system 1005 and received on planar surface. FIG. 10B schematically illustrates different ways that projected light can be adjusted.

In FIG. 10A, optical projection system 1005 includes shaping rod 1015 and projection optics 1020, including three spherical lenses and a wedge prism, as described above. Shaping rod 1015 can be coupled to a mount 1016 allowing shaping rod 1015 to be offset from the central axis 1055 of the projection optics, as described above. Mount 1016 can also allow for rotation 1017 of shaping rod 1015, such as about the rod axis 1050. Similarly, projection optics 1020 can be coupled to a mount 1021 allowing the central axis 1055 of projection optics 1020 to be offset from the rod axis 1050 or the emission axis, as described above. Mount 1021 can also allow for rotation 1022 of projection optics 1020 about their central axis 1055. Additional adjustments that can be made include the relative position 1080 of projection optics 1020 (e.g., the distances between the projection optics 1020 and the planar surface and between the projection optics 1020 and the shaping rod 1015), the overall position 1085 of optical projection system 1005 (e.g., the distance between optical projection system and the planar surface), and the overall tilt 1090 or orientation of the optical projection system (e.g., relative to the planar surface). In some cases, rotatable and/or translatable mounts can be used, which can be computer controlled or manually controlled, in various embodiments.

These adjustments can impact the size, position, focus, or orientation of projected light, allowing for robust control over the projection of light onto a region of interest by making adjustments to the mounts or relative positions of various components. The top left panel of FIG. 10B shows a change in the overall size of the projected light 1095 relative to the region of interest 1096, which can be achieved by adjusting the overall position 1085 of the optical projection system 1005. The top right panel of FIG. 10B shows a change in the focus of the projected light 1095, which can be achieved by adjusting the relative position 1080 of the projection optics 1020. The bottom left panel of FIG. 10B shows a translation along a Y-axis of the projected light 1095 relative to the region of interest 1096, which can be achieved by adjusting the overall tilt 1090 of the optical projection system 1005. The bottom right panel of FIG. 10B shows a translation along an X-axis of the projected light 1095 relative to the region of interest 1096, which can be achieved by adjusting the rotation 1022 of projection optics 1020 about their central axis 1055. The center panel of FIG. 10B shows a rotation of the projected light 1095 relative to the region of interest 1096, which can be achieved by adjusting the rotation of the shaping rod 1015 about the rod axis 1050.

Figure 11:
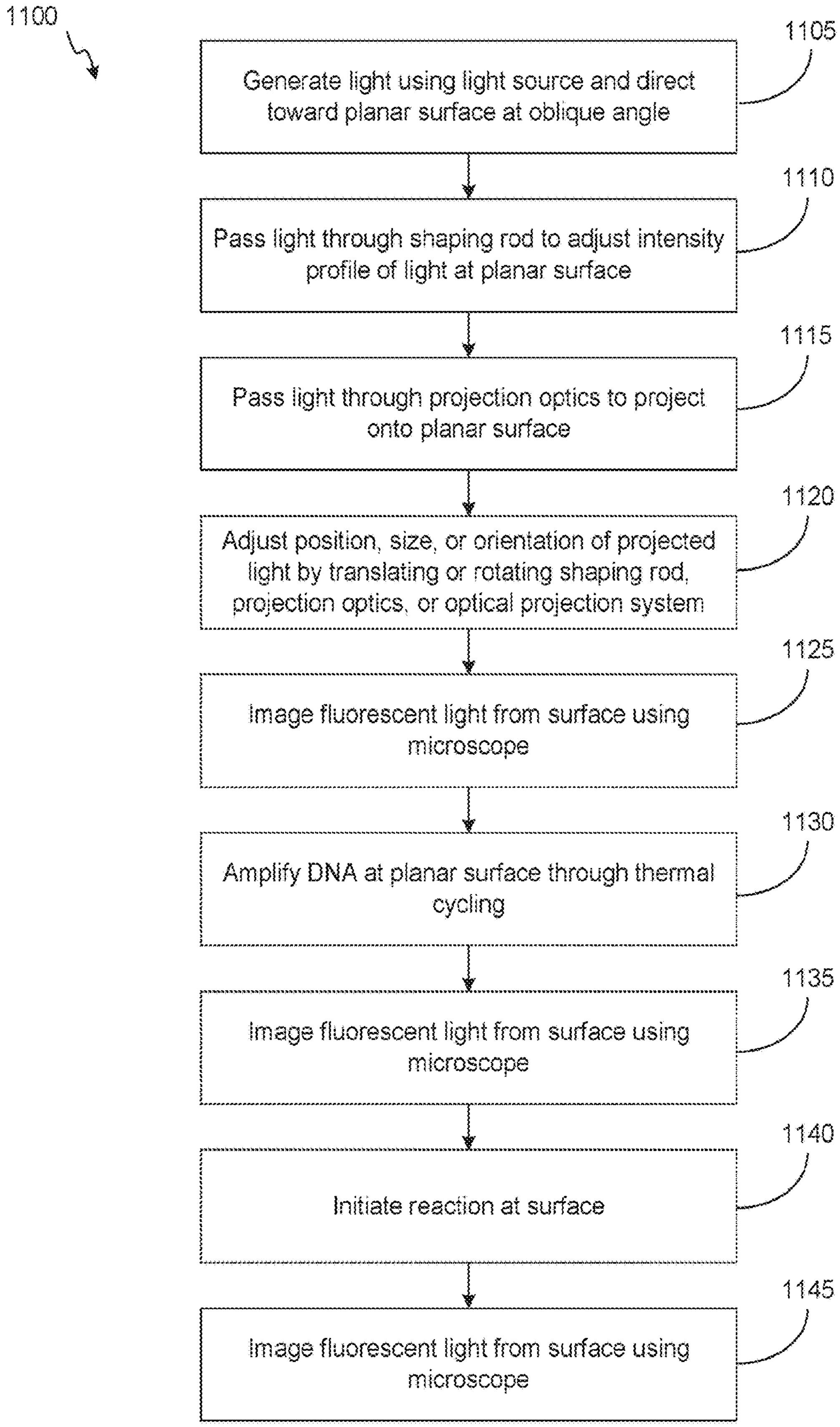
FIG. 11 provides a flowchart with an overview of an example method for projecting light in accordance with embodiments described herein.

FIG. 11 provides an overview of an exemplary method 1100 in accordance with various implementations. Method 1100 starts at block 1105, where light is generated using a light source and is directed toward a planar surface at an oblique angle. The light source may be any suitable light source, such as a laser source or a light emitting diode (LED) source, but other light generating components are contemplated. The light source can include or be coupled to various optics or components to direct, filter, or focus the generated light. In some cases, reflectors, lenses, waveguides, gratings, filters, prisms, polarizers, windows, or the like may be included as part of or coupled to the light source. In some embodiments, a collimator lens is used to generate collimated light from the light source. Optionally, one or more optical filters, such as may be provided via a filter wheel including one or more shortpass filters, longpass filters, or bandpass filters, may be used to filter the light from the light source. Light from the source may have any suitably shaped intensity distribution, but a circularly symmetric distribution may be preferred. Light from the light source can have an average propagation direction, which may be referred to herein as an emission axis. It will be appreciated that although the light from the source is characterized as having an emission axis, all light from the source need not travel directly along the emission axis, as light from the source can be emitted from the source along a range of angles. In some cases, such as using a laser source or other highly collimated light source, the emission axis can be along the same direction as the emission, though it will be appreciated that light in a highly collimated source can also spread along a range of angles, such as due to focusing, but still have an emission axis corresponding to an average propagation direction.

At block 1110, light from the source is passed through the shaping rod to adjust the intensity profile of the light. Light from the source may be focused so as to suitably enter the shaping rod. The shaping rod can comprise a prism or other optical component, and may be an elongated structure with a length axis, sometimes referred to herein as a rod axis, with flat polished ends. The shaping rod can have an optical coating thereon, such as an antireflection coating or other coating. The shaping rod can act as a waveguide, allowing light entering one end to be transmitted, such as directly or via total internal reflection, to the opposite end. The shaping rod can have any suitable cross-sectional shape, which may be useful for transforming an intensity distribution from the light source to a desired shaped intensity distribution, such as matching or approximating a region of interest at the planar surface. In some examples, the light source can have a circular intensity distribution, the shaping rod can have a trapezoidal cross-sectional shape, and the region of interest can be rectangular or square in shape. In some examples, the light source can have a circular intensity distribution, the shaping rod can have an elliptical cross-sectional shape, and the region of interest can be circular in shape.

At block 1115, light from the shaping rod is passed through the projection optics to project the light onto the planar surface. The projection optics can have a central axis, such as an axis that passes through the center of the spherical lens element components of the projection optics. The relative position of the projection optics and the shaping rod can be adjusted, such as described above where a rod axis of the shaping rod is offset from a central axis of the projection optics, so as to adjust an intensity profile of the light reaching the planar surface. In embodiments, a more uniform intensity profile may be desired and including an offset between the rod axis of the shaping rod and the central axis of the projection optics can be useful for making the intensity profile of the light at the planar surface more uniform.

The projection optics may include a wedge prism, so as to adjust a lateral shift of the projected light, which may be needed due to the offset between the rod axis and the central axis and the local geometry which may prevent or otherwise limit the position of the optical system. Advantageously, inclusion of a wedge prism in the projection optics can also allow for adjustments to the lateral position of the projected light by rotating the projection optics around the central axis.

Blocks 1120, 1125, 1130, 1135, and 1140 are optional and may be used in some methods but not in other methods. At block 1120, a position, size, or orientation of the projected light can be adjusted, such as by translating or rotating the shaping rod, the projection optics, or the optical projection system including the light source, the shaping rod and the projection optics, as described above with reference to FIG. 10A and FIG. 10B. In this way, the position, size, and orientation of the projected light can be adjusted to suitably match a region of interest of the planar surface.

At blocks 1125, 1135, and/or 1145, fluorescent light from the planar surface may be imaged using a microscope positioned to collect and image light from the planar surface. For example, in cases where the planar surface contains fluorescent compositions, illumination with light from the light source may generate fluorescent light, which can be collected and imaged by the microscope. As shown in FIG. 9, a microscope may include one or more lenses, filters, and imaging devices (e.g., a camera), to allow for quantitative measurement of the fluorescent light. The intensity of fluorescent light may be proportional to a concentration of a particular fluorophore contained in the planar surface. The process of collecting and imaging the fluorescent light may be repeated one or more times, such as to establish an initial concentration of a fluorophore and to identify changing concentrations of the fluorophore over time, such as after initiation of a reaction involving the fluorophore as a reactant or a product.

For example, at block 1130, a nucleic acid molecule may be amplified, such as using a polymerase chain reaction (PCR) process in which temperatures of a reaction site at the planar surface are cycled to drive the melting and replication of the nucleic acid molecules. The use of thermal cycling is not limited to nucleic acid amplification and may be used to drive others reactions. Thermal cycling may be performed using a thermal block coupled to the planar surface, such as including a Peltier device and a heat sink or other device or components for adding and removing heat from the planar surface.

At block 1140, a reaction may be initiated at the surface. For example, thermally driven reactions may be initiated by thermal cycling, as described above. In another example, a reaction may be initiated by contacting reactants with one another at the planar surface, such as by mixing two different reactants at the planar surface using microfluidic channels.

As noted above, fluorescent light from the planar surface may be imaged, at block 1145, such as to establish a concentration of a particular fluorophore at an instance in time. It will be appreciated that the light from the light source can be projected onto the surface continuously or discretely, such as when measurements of fluorescent light are needed.

STATEMENTS REGARDING INCORPORATION BY REFERENCE AND VARIATIONS

All references throughout this application, for example patent documents, including issued or granted patents or equivalents and patent application publications, and non-patent literature documents or other source material are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2, and/or 3" is equivalent to "1, 2, 3, 1 and 2, 1 and 3, 2 and 3, or 1, 2 and 3".

Every formulation or combination of components described or exemplified can be used to practice the invention, unless otherwise stated. Specific names of materials are intended to be exemplary, as it is known that one of ordinary skill in the art can name the same material differently. It will be appreciated that methods, device elements, and materials other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition, in a description of a method, or in a description of elements of a device, is understood to encompass those compositions, methods, or devices consisting essentially of and consisting of the recited components or elements, optionally in addition to other components or elements. The invention illustratively described herein suitably may be practiced in the absence of any element, elements, limitation, or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. An optical projection system for illuminating a planar surface, the optical projection system comprising:

a light source directed to emit light along an emission axis, the emission axis oriented non-orthogonal to the planar surface;

a shaping rod in optical communication with the light source, the shaping rod having a rod axis aligned parallel to the emission axis; and projection optics in optical communication with the shaping rod, the projection optics comprising a plurality of optical elements arranged along a central axis that is offset from and does not intersect the rod axis and, the projection optics further comprising an output axis that is angled relative to the central axis;

wherein the planar surface comprises, retains, or is configured to retain a microarray or microfluidic device comprising a plurality of reaction sites distributed across the planar surface;

the optical projection system further comprising a microscope system in optical communication with the planar surface, the microscope system comprising one or more collection lenses for collecting scattered or emitted light from the planar surface;

the optical projection system further comprising a thermal block coupled to the microfluidic device or a thermocycling device coupled to the microfluidic device; and wherein the planar surface is positioned between the microscope system and the thermal block or the thermocycling device.

2. The optical projection system of claim 1, wherein the light source has a circularly symmetric intensity profile.

3. The optical projection system of claim 1, wherein the light source generates collimated light along the emission axis.

4. The optical projection system of claim 1, wherein the shaping rod comprises a prism having a curved cross-sectional shape.

5. The optical projection system of claim 1, wherein the shaping rod is positioned for projecting light from the light source onto an area of the planar surface with a Y-axis uniformity ratio of 50% or more and an X-axis uniformity ratio of 50% or more.

6. The optical projection system of claim 1, wherein the shaping rod comprises a prism having a polygonal cross-sectional shape or a trapezoidal cross-sectional shape.

7. The optical projection system of claim 6, wherein the shaping rod is positioned for projecting light from the light source onto the planar surface with a rectangular shape or square shape.

8. The optical projection system of claim 7, wherein the light projected onto the rectangular shape or square shape has a y-axis uniformity ratio of 50% or more and an x-axis uniformity ratio of 50% or more.

9. The optical projection system of claim 1, wherein the shaping rod is coupled to a mount allowing rotation of the shaping rod about the rod axis.

10. The optical projection system of claim 1, wherein the central axis of the projection optics is offset from the emission axis by a distance of from 1 mm to 20 mm.

11. The optical projection system of claim 1, wherein the projection optics comprise a wedge prism positioned to shift input light oriented along or parallel to the central axis to output light oriented along the output axis.

12. The optical projection system of claim 11, wherein the wedge prism is positioned to align the output light over a center of the planar surface, or wherein the projection optics further comprise a first lens on an input side of the wedge prism and a second lens on an output side of the wedge prism.

13. The optical projection system of claim 1, wherein the projection optics are coupled to a mount allowing rotation of the projection optics about the central axis or allowing translation of the projection optics along a direction perpendicular to the central axis.

14. The optical projection system of claim 1, wherein translation of the projection optics along the direction perpendicular to the central axis changes an offset between the central axis and the emission axis.

15. The optical projection system of claim 1, wherein the microscope system has an optical axis oriented orthogonal to the planar surface.

16. The optical projection system of claim 1, further comprising:

one or more flow controllers arranged to direct fluid flow in the microfluidic device;

or a temperature controller for adjusting a temperature of the microfluidic device.

17. The optical projection system of claim 1, further comprising a translation or rotation stage supporting at least the shaping rod and projection optics for adjusting a relative position or orientation between the planar surface and the shaping rod and projection optics.

18. The optical projection system of claim 1 wherein the shaping rod modifies a source intensity profile of light from the light source to another shape.

19. The optical projection system of claim 18 wherein the shaping rod modifies a circular intensity profile of light from the light source to a rectangular shape.

20. A method for illuminating a planar surface using an optical projection system, the method comprising:

directing light from a light source along an emission axis, the emission axis oriented non-orthogonal to the planar surface;

passing the light through a shaping rod, the shaping rod having a rod axis aligned along the emission axis;

passing the light through projection optics, the projection optics comprising a plurality of optical elements arranged along a central axis that is offset from and does not intersect the rod axis and, the projection optics further comprising an output axis that is angled relative to the central axis; and directing the light from projection optics onto the planar surface, wherein the planar surface comprises, retains, or is configured to retain a microarray or microfluidic device comprising a plurality of reaction sites distributed across the planar surface;

the optical projection system further comprising a microscope system in optical communication with the planar surface, the microscope system comprising one or more collection lenses for collecting scattered or emitted light from the planar surface;

the optical projection system further comprising a thermal block coupled to the microfluidic device or a thermocycling device coupled to the microfluidic device; and wherein the planar surface is positioned between the microscope system and the thermal block or the thermocycling device.

21. The method of claim 20 wherein the shaping rod modifies a source intensity profile of light from the light source to another shape.

22. The method of claim 21 wherein the shaping rod modifies a circular intensity profile of light from the light source to a rectangular shape.

* * * * *